United States Patent
Nie

(10) Patent No.: US 10,167,376 B2
(45) Date of Patent: Jan. 1, 2019

(54) HEAVY METAL FREE HALOGENATED POLYMER COMPOUND

(71) Applicant: LUBRIZOL ADVANCED MATERIALS, INC., Cleveland, OH (US)

(72) Inventor: Li Nie, Broadview Hts., OH (US)

(73) Assignee: LUBRIZOL ADVANCED MATERIALS, INC., Cleveland, OH (US)

( * ) Notice: Subject to any disclaimer, the term of this patent is extended or adjusted under 35 U.S.C. 154(b) by 245 days.

(21) Appl. No.: 14/773,089

(22) PCT Filed: Mar. 12, 2014

(86) PCT No.: PCT/US2014/024106
§ 371 (c)(1),
(2) Date: Sep. 4, 2015

(87) PCT Pub. No.: WO2014/150743
PCT Pub. Date: Sep. 25, 2014

(65) Prior Publication Data
US 2016/0009896 A1    Jan. 14, 2016

Related U.S. Application Data

(60) Provisional application No. 61/789,659, filed on Mar. 15, 2013.

(51) Int. Cl.
*C08K 3/34* (2006.01)
*C08K 5/098* (2006.01)
*C08L 57/08* (2006.01)
*F16L 9/12* (2006.01)

(52) U.S. Cl.
CPC .............. *C08K 5/098* (2013.01); *C08K 3/34* (2013.01); *C08L 57/08* (2013.01); *F16L 9/12* (2013.01)

(58) Field of Classification Search
CPC . C08K 3/34; C08K 5/098; C08L 57/08; F16L 9/12
USPC .......................................................... 524/394
See application file for complete search history.

(56) References Cited

U.S. PATENT DOCUMENTS

| | | | |
|---|---|---|---|
| 5,100,946 A * | 3/1992 | Hung | C08K 5/098 524/178 |
| 6,096,820 A † | 8/2000 | Lockledge | |
| 7,741,390 B2 † | 6/2010 | Wehner | |
| 2003/0166752 A1 | 9/2003 | Detterman et al. | |
| 2008/0312363 A1 † | 12/2008 | Fokken | |
| 2016/0017123 A1 * | 1/2016 | Nie | C08K 5/005 138/177 |

FOREIGN PATENT DOCUMENTS

| | | |
|---|---|---|
| EP | 2363431 | 9/2011 |
| JP | S61 34042 A | 2/1986 |
| WO | WO 2012/143794 | * 10/2012 |

OTHER PUBLICATIONS

European Patent Office, International Search Report for PCT/US14/024106, dated Jun. 30, 2014.
European Patent Office, Written Opinion of the International Searching Authority for PCT/US14/024106, dated Jun. 30, 2014.

* cited by examiner
† cited by third party

*Primary Examiner* — Angela C Scott
(74) *Attorney, Agent, or Firm* — Christopher Demas; Teresan Gilbert

(57) ABSTRACT

The disclosed technology relates to chlorinated polyvinyl chloride (CPVC) compounds being free of heavy metals, particularly heavy metals in the form of stabilizer additives, the most common heavy metal being tin.

11 Claims, No Drawings

HEAVY METAL FREE HALOGENATED POLYMER COMPOUND

BACKGROUND OF THE INVENTION

The disclosed technology relates to halogenated polymer compounds, such as chlorinated polyvinyl chloride (CPVC) compounds, being free of heavy metals, particularly heavy metals in the form of stabilizer additives, the most common heavy metals being lead, tin, zinc, cadmium, and barium.

Halogen containing polymers tend to degrade or deteriorate when processed. Generally, the difference between the processing temperature and the degradation temperature is very small. Therefore, there is a risk that during the processing these halogen containing polymers will degrade. When such polymers degrade, it is believed that the halide acid generated by the polymer attacks the components of the processing equipment. Also, this acid further catalyzes dehydrohalogenation reactions, such as HCl elimination, and additional degradation of the polymer.

Stabilizers have been developed to help deter such degradation. For example, heavy metal compounds such as tin are commonly used. However, heavy metal compounds are considered environmentally unfriendly, and there is a move to limit their use in many jurisdictions. In anticipation of increased regulation of heavy metal stabilizers in halogenated polymers, there is a desire in the industry to discover replacement stabilizers.

Zeolites and metal carboxylates have been taught as co-stabilizers in halogen containing polymers, generally in addition to heavy metal stabilizers, but also in combination with other types of stabilizers.

Zeolites are effective acid scavengers for halogen containing polymers and can enhance the polymer's thermal stability. Acid scavengers are compounds that react with acid groups in the polymer reaction mixture to form compounds that are typically chemically inert. Such acid scavengers are often required as co-stabilizers in halogenated polymers to neutralize the acid generated during melt processing. However, the use of zeolites as acid scavengers in halogen containing polymer compounds has been limited for several reasons. First, the zeolites generally have a large particle size, generally in the range of about 3 to about 6 microns. The large size of the zeolite particles is thought to not only cause surface blemishes on the finish of the end product made from such a polymer but also to diminish the physical properties, for example impact strength, of such polymers. Further, outgassing occurs frequently with polymers containing zeolites due to the evolution of water from the zeolite from the heat generated during melt processing. Such outgassing can cause foaming and affect the physical properties of the final product.

Metal carboxylates are also mentioned as potential co-stabilizers. However, when included at too high a concentration metal carboxylates have a tendency to plate-out (separate from the halogen polymer containing compound).

U.S. Pat. No. 4,371,656 describes an "improved" metal substituted zeolite covered by an organic substance and having a water content of 8 weight percent (wt %) or less for use as a stabilizer for halogen containing resins. The zeolite is taught to be suitable as it is, but that it may function more effectively when used in combination with other stabilizers.

A number of references teach the use of zeolite as a stabilizer in combination with other stabilizers. For example, U.S. Pat. No. 5,582,873 discloses a composition comprising a halogen containing polymer, a zeolite as the acid scavenger and a heat stabilizer selected from the group consisting of mixed metal stabilizers (such as calcium/zinc or calcium/barium), organotin stabilizers, lead stabilizers, metal free stabilizers or any combination thereof. Similarly, U.S. Pat. No. 6,414,071, to Wypart et al., issued Jul. 2, 2002 teaches a stabilized halogenated polymer wherein the stabilizer is a synthetic crystalline aluminosilicate of formula $M_{2/n}O \cdot Al_2O_3 \cdot ySiO_2 \cdot wH_2O$. For CPVC resins, the patent teaches and exemplifies the synthetic crystalline aluminosilicate in use with heavy metal stabilizers, including tin.

Other references teach the use of zeolite in combination with sodium carboxylate. However, no references have been found that do not include other stabilizers with the zeolite/sodium carboxylate combination. For example, EP2083044A1 to Reagens S.p.A. teaches a composition for stabilizing halogen-containing polymers comprising disodium adipate and a compound selected from the group consisting of $M(ClO_4)$ and $(CF_3SO_3)_nM$. Zeolite and carboxylates are also taught as additives that can optionally be included in the EP'044 composition. However, the patent discourages the use of zeolites by noting that zeolites tend to release water, which prevents their use as stabilizers in some rigid or semi-rigid PVC applications. The patent does not teach or exemplify a formulation containing CPVC, a zeolite and a carboxylate. Similarly, EP2363431A1 to Reagens S.p.A. teaches a composition for stabilizing halogen-containing polymers comprising an alkali metal salt of adipic acid and an alkali metal salt of a carboxylic acid. Zeolite is taught as an optional additional additive in the EP'431 composition, in an amount from 0.1 to 3 parts by weight per 100 parts by weight of polymer. The patent does not teach or exemplify a formulation containing CPVC and a stabilizer package consisting of a zeolite and a carboxylate.

It would be beneficial to the industry to prepare an inexpensive and readily available alternative to current stabilizer systems for halogenated polymers, such as CPVC resins, without the need for a heavy metal stabilizer.

SUMMARY OF THE INVENTION

The art above does not provide any teaching or suggestion that zeolite and metal carboxylates can be employed on their own as stabilizers, or provide a synergy when employed together. The disclosed technology, therefore, solves the problem of stabilizing halogenated resins, preferably rigid halogenated resins, for example rigid CPVC, by employing zeolite on its own or in combination solely in a synergistic combination with a metal carboxylate co-stabilizer.

In one aspect, the disclosed technology provides a stabilized halogenated polymer, such as chlorinated polyvinyl chloride (CPVC), composition. The stabilized composition can comprise (a) a halogenated polymer, such as CPVC resin, and (b) a stabilizer system. The stabilizer system can comprise, consist essentially of, or consist of at least one of zeolite, $C_6$ to $C_{12}$ metal carboxylate, and combinations thereof.

In one embodiment, the stabilized halogenated polymer composition can include both zeolite and a $C_6$ to $C_{12}$ metal carboxylate. In such an embodiment, the weight ratio of zeolite to the $C_6$ to $C_{12}$ metal carboxylate can be between about 6:1 to 1:6.

In another embodiment, the stabilized halogenated polymer composition can contain the stabilizer system in amount of from about 0.1 to about 6.0 parts by weight per 100 parts by weight of said halogenated polymer.

In certain embodiments, zeolite can be present in the stabilizer system from about 0.1 to about 3.0 parts by weight per 100 parts by weight of said halogenated polymer.

Likewise, the $C_6$ to $C_{12}$ metal carboxylate can be present in the stabilizer system from about 0.1 to about 3.0 parts by weight per 100 parts by weight of said halogenated polymer. The carboxylate of the metal carboxylate can be at least one of suberate ($C_8$), sebacate ($C_{10}$), dodecandioate ($C_{12}$) and combinations thereof.

The stabilized halogenated polymer composition can be employed to prepare pipe in one aspect and pipe fittings in another aspect.

In another aspect, there is provided a method of stabilizing a halogenated polymer composition comprising employing in the composition a stabilizer system consisting essentially of or consisting of at least one of zeolite, $C_6$ to $C_{12}$ metal carboxylate, and combinations thereof.

In an embodiment, the compositions and methods of the present technology exclude heavy metal stabilizers, such as tin stabilizers.

DETAILED DESCRIPTION OF THE INVENTION

Various preferred features and embodiments will be described below by way of non-limiting illustration.

One aspect of the invention is a halogenated polymer compound, for example a chlorinated polyvinyl chloride (CPVC), comprising (a) a halogenated polymer, such as a CPVC resin, and (b) a stabilizer system.

In a preferred embodiment, the halogenated resin is a rigid halogenated resin. Rigid polymers in this specification can be defined according to ASTM D883. More specifically, a rigid polymer as used herein means a polymer having a either a flexural or tensile modulus of elasticity of 700 MPa (100,000 psi) or more measured at a temperature of 23° C. in an atmosphere of 50% relative humidity when tested in accordance with Test Methods ASTM D747, D790, D638, or D882.

Halogenated polymers include, for example, halogenated polyolefin homopolymers, halogenated polyolefin copolymers, polymer blends containing a halogenated polyolefin homopolymer or copolymer, vinyl halide homopolymers, vinyl halide copolymers and polymer blends containing vinyl halide homopolymer or copolymers. As vinyl halide homopolymers, vinyl halide copolymers and polymer blends containing vinyl halide homopolymers or vinyl halide copolymers usable in the practice of this invention there, for example, may be used (1) polyvinyl chloride, polyvinylidene chloride, polyvinyl bromide, polyvinyl fluoride, polyvinylidene fluoride, (2) copolymers of vinyl chloride with a copolymerizable ethylenically unsaturated monomer such as vinylidene chloride, vinyl acetate, vinyl butyrate, vinyl benzoate, diethyl fumarate, diethyl maleate, other alkyl fumarates and maleates, vinyl propionate methyl acrylate, 2-ethylhexyl acrylate, butyl acryalate, ethyl acrylate, and other alkyl acrylates, methyl methacrylate, ethyl methacrylate, butyl methacrylate, hydroxyethyl methacrylate and other alky methacrylates, methyl alpha chloracrylate, styrene, vinyl ethers such as vinyl ethyl ether, vinyl chloroethyl ether, vinyl phenyl ether, vinyl ketones such as vinyl methyl ketone, vinyl phenyl ketone, 1-fluoro-1-chlorothelene, acrylonitrile, chloroacrylonitrile, allylidene diacetate, chloroallylidene diacetate, ethylene and propylene, and (3) polymer blends such as blends of polyvinyl chloride and polyethylene, polyvinyl chloride and chlorinated polyethylene, polyvinyl chloride and polymethyl methacrylate, polyvinyl chloride and polybutylemethacrylate, polyvinyl chloride and polystyrene, polyvinyl chloride and acrylonitrilebutadiene-styrene copolymer, and polyvinyl chloride and polyetheylene and polymethyl methacrylate.

Preferred halogenated polymers are polyvinyl chloride (PVC) and chlorinated polyvinyl chloride (CPVC) resin, also referred to simply as PVC and CPVC. Most preferred is CPVC. CPVC, in general is comprised of a straight carbon chain backbone having hydrogen and chlorine covalently bonded and branching from individual carbon atoms along the backbone. Each carbon atom may contain from 0 to 2 chlorine atoms, as shown, for example, in formula I. Without being bound by theory, it is believed that the extent to which the carbon atoms are chlorinated can affect the properties of the CPVC, as well as any compound containing the CPVC or pipe extruded therefrom. For a typical pipe or fitting resin, CPVC according to the present invention can contain less than about 11.0 mole %, or from about 1.0 to about 10.0 mole %, or from about 3.0 to about 9.0 mole % of $CCl_2$. In general, lower amounts of $CCl_2$ are desirable for a CPVC resin. In another embodiment, CPVC according to the invention can contain from about 52.0 to about 66 mole %, or from about 54.0 to about 60.0 mole % CHCl.

Formula I

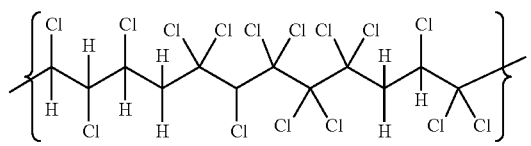

It is further contemplated in the present invention that the CPVC resin can contain some unsaturation (i.e. double bonds) along the backbone. CPVC according to one aspect of the invention can contain from about 0.0 to about 4.0 mole %, or from about 1.0 to about 3.0 mole %. For example, for every 100 carbon bonds in the CPVC backbone, from average of about 0.0 or 1.0 to an average of about 4.0 of the bonds can be unsaturated.

In contrast to CPVC, PVC contains only about 50% $CH_2$ and about 50% CHCl moieties, with no $CCl_2$ moieties and very near 0% unsaturation. As such, PVC is a much more stable polymer intrinsically than CPVC.

CPVC can be prepared by chlorinating poly(vinyl chloride) (PVC) polymer. There are considerations pertaining to the precursor PVC from which are derived the post polymerization chlorination product (CPVC) employed in this invention. The molecular weight of PVC as indicated by inherent viscosity (I.V.) measurement per ASTM D1243 should generally range from about 0.4 to about 1.4 at the extremes. Desirably, the I.V. of precursor PVC employed falls within a range of from about 0.6 to about 1.4 for pipe and fittings, generally pipe is about 0.90 to about 1.05 and generally pipe fittings are about 0.6 to about 0.8. The preferred polymerization method for preparing said PVC is the aqueous suspension method. This is the predominant method used in the art. A detailed description of the suspension process is beyond the scope of the invention and therefore will not be disclosed. The suspension process for polymerization of PVC is described in *The Encyclopedia of PVC*, Marcel Decker, Inc. (1976).

CPVC suitable for use in the instant invention may be derived from a PVC copolymer having about 5 parts or less of a co-monomer. Where the precursor PVC contains less than about 5 parts total of one or more co-monomers per 100 parts of vinyl chloride, the chlorinated version of this polymer will also be referred to herein as CPVC.

Co-monomers can include esters of acrylic acid wherein the ester portion has from 1 to 12 carbon atoms, for example, methyl acrylate, ethyl acrylate, butyl acrylate, octyl acrylate, cyano-ethyl acrylate, and the like; vinyl acetate; esters of methacrylic acid wherein the ester portion has from 1 to 12 carbon atoms, such as methyl methacrylate (MMA), ethyl methacrylate, butyl methacrylate, and the like; acrylonitrile, and methacrylonitrile; styrene derivatives having a total of from 8 to 15 carbon atoms such as alpha-methylstyrene, vinyl toluene, chlorostyrene; vinyl naphthalene; diolefins having a total of from 4 to 8 carbon atoms such as isoprene, and including halogenated olefins such as chlorobutadiene, monoolefins such as ethylene and propylene and having from 2 to 10 carbon atoms, desirably 2 to 4 carbon atoms and preferably 4 carbon atoms, with isobutylene being highly preferred. If co-monomers are used, preferred are MMA, copolymerizable imides such as N-cyclohexyl maleimide and co-monomers known to copolymerize with vinyl chloride monomer and yield a copolymer having a Tg equal to or higher than homo-PVC. The preferred CPVC is derived from a PVC homopolymer. It is also contemplated that a small portion of the solvent in which the PVC is polymerized can copolymerize therewith. For example, vinyl chloride can advantageously be prepared in the presence of a chain modifying co-reactant solvents such as, for example, THF, an ethylenically unsaturated alkylene such as an alpha olefin or a reactive mercaptan such as 2-mercapto ethanol, and small portions thereof may be present as co-monomer in the resultant PVC.

CPVC resin is known to the art and to the literature and is commercially available. CPVC suitable for the CPVC compound disclosed herein can be made according to any commercial chlorination process or the like such as by a solution process, a fluidized bed process, a preferred water slurry process, a thermal process, or a liquid chlorine process. Reference is hereby made for example, to U.S. Pat. Nos. 2,996,049 and 3,100,762, with regard to suitable types of CPVC within the range of chlorine content which can be utilized, as well as to methods of preparation and the like.

In theory, CPVC employed herein may contain generally small amounts of non-chlorinated repeat units of vinyl chloride (VC) monomer. The amount of residual VC monomer repeat units can be from about 45.0 to about 62.0 wt %.

CPVC resin preferred in this specification includes CPVC having a specified weight percent (wt %) of chlorine from about 57.0 to about 70.0 wt %, more preferably, from about 60.0 to about 69.0 wt %, and even more preferably from about 63.0 to about 68.0 wt %, and most preferably between about 64.0 or 65.0 and 67.0 wt %. The wt % chlorine is based on the weight of the CPVC resin.

The CPVC resin can be included in a CPVC compound. A compound refers to a composition containing one or more resins and one or more additives. Examples of suitable CPVC resins which can be used include the following TempRite™ CPVC resins: 674×571, 674×663 and 677×670, for example. TempRite™ is a registered trademark of Lubrizol Advanced Materials and the above enumerated resins are all commercially available from Lubrizol Advanced Materials in Cleveland, Ohio.

The CPVC compound includes a stabilizer system in addition to CPVC resin. The stabilizer system can comprise, consist essentially of, or consist of at least one zeolite, at least one $C_6$ to $C_{12}$ metal carboxylate, or a combination thereof. By "consist essentially of" it is meant that the compound may include some small amount of other stabilizer in amounts insignificant to the stabilization of the product, generally in the range of less than 1 phr, or less than 0.75 phr or less than 0.5 phr, or even less than 0.25 phr.

The stabilizer system can include an effective amount of at least one zeolite. Zeolites comprise basically a three dimensional framework of $SiO_4$ and $AlO_4$ tetrahedra. The tetrahedra are crosslinked through the sharing of oxygen atoms so that the ratio of oxygen atoms to the total of the aluminum and silicon atoms is equal to 2. This relationship is expressed as O/(Al+Si)=2. The electrovalence of the tetrahedra containing aluminum and silicon is balanced in the crystal by the inclusion of a cation. For example, the cation can be an alkali or alkaline earth metal ion. The cation can be exchanged for another depending upon the final usage of the aluminosilicate zeolite. The spaces between the tetrahedra of the aluminosilicate zeolite are usually occupied by water. Zeolites can be either natural or synthetic.

The basic formula for all aluminosilicate zeolites is represented as follows:

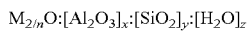

wherein M represents a metal, n represents the valence of the metal and X and Y and Z vary for each particular aluminosilicate zeolite. Essentially it is believed that any aluminosilicate zeolite can be used as a stabilizer in the instant invention, provided that the ratio of the silicon to aluminum in such aluminosilicate zeolite is less than 3.0 and that the aluminosilicate zeolite can be incorporated into the CPVC compound. Preferably, the zeolite ratio of silicon to aluminum in such aluminosilicate zeolite is less than 1.5. Most preferably, the ratio of silicon to aluminum in such aluminosilicate zeolite is about 1.

Example zeolites which can be used in the instant invention include but are not limited to zeolite A, described in U.S. Pat. No. 2,822,243; zeolite X, described in U.S. Pat. No. 2,822,244; zeolite Y, described in U.S. Pat. No. 3,130,007; zeolite L, described in Belgian Pat. No. 575,117 zeolite F, described in U.S. Pat. No. 2,996,358; zeolite B, described in U.S. Pat. No. 3,008,803; zeolite M, described in U.S. Pat. No. 2,995,423; zeolite H, described in U.S. Pat. No. 3,010,789; zeolite J, described in U.S. Pat. No. 3,011,869; zeolite P, described in U.S. Pat. No. 3,532,459, and zeolite W, described in U.S. Pat. No. 3,102,853.

The preferred zeolites can include, alone or in combination with another Group I metal, hydrated silicates of aluminum incorporating sodium, of the type $mNa_2O.xAl_2O_3.ySiO_2.zH_2O$. These preferred zeolites include zeolites A, P, X, and Y.

In the prior art, it is preferable to include the zeolite at sub-micron particle sizes (e.g., D50 by volume of less than 1 micron) and a water content of less than 10 weight percent to avoid moisture issues in the compound, such as foaming. However, it has been found that the at least one zeolite can be employed at any particle size distribution, particle size, and water content as a sole stabilizer, or in combination with a $C_6$ to $C_{12}$ metal carboxylate.

As a sole stabilizer, the zeolite can generally be present at from about 0.1 to about 4.0 phr. The abbreviation "phr" is used in this specification to express the amount of an additive component by weight based on 100 parts by weight of the CPVC resin. In some embodiments, the zeolite can be present from about 0.25 to about 3.5 phr, or 0.5 to about 3.0 phr. In a preferred embodiment, the zeolite can be present from about 0.75 to about 1.5 or 2.5 phr.

The $C_6$ to $C_{12}$ metal carboxylate can be a metal salt of a saturated $C_6$, or $C_7$, or $C_8$ to $C_{11}$, or $C_{12}$ aliphatic carboxylate or di-carboxylate, an unsaturated $C_6$ to $C_{12}$ aliphatic carboxylate or di-carboxylate, a saturated $C_6$ to $C_{12}$ aliphatic carboxylate or di-carboxylate substituted with at least one OH group, or whose chain is interrupted by at least one oxygen atom (oxyacids), or a cyclic or bicyclic carboxylate or di-carboxylate containing from 6, or 7, or 8 to 11 or 12 carbon atoms. Suitable metals for the metal carboxylate can include Li, K, Mg, Ca, and Na.

Preferably the $C_6$, or $C_7$ or $C_8$ to $C_{11}$ or $C_{12}$ metal carboxylate is a sodium carboxylate, most preferably a disodium carboxylate, such as disodium sebacate, disodium dodecanedioate or disodium suberate, and combinations thereof. Other examples of $C_6$ to $C_{12}$ metal carboxylates that may be employed include disodium adipate, disodium azelate, and disodium undecanedioate.

The $C_6$ to $C_{12}$ metal carboxylate can be present from about 0.1 to about 4.0 phr. In some embodiments, the $C_6$ to $C_{12}$ metal carboxylate can be present from about 0.25 to about 3.0 phr, or 0.5 to about 2.5 phr. In a preferred embodiment, the $C_6$ to $C_{12}$ metal carboxylate can be present from about 1.0 to about 2.0 phr. The metal carboxylate can be dry blended with other ingredients of a compound or the CPVC resin can be coated with a metal carboxylate solution by a wet coating process followed by drying to obtain a metal carboxylate coated CPVC resin.

When in combination, the zeolite and $C_6$ to $C_{12}$ metal carboxylate can be present at levels that do not negatively affect the ability of the CPVC compound to meet physical property limitations and that avoid moisture foaming. With respect to moisture foaming, it has been found that including zeolite in combination with the $C_6$ to $C_{12}$ metal carboxylate at specified ratios diminishes the propensity of the zeolite to cause moisture foaming. In one embodiment the weight ratio of zeolite to the $C_6$ to $C_{12}$ metal carboxylate can be between about 6:1 to 1:6. In another embodiment, the weight ratio of zeolite to $C_6$ to $C_{12}$ metal carboxylate can be from about 5:1 to 1:5, or 4:1 to 1:4, or even 3:1 to 1:3. In some preferred embodiments the weight ratio of zeolite to $C_6$ to $C_{12}$ metal carboxylate can be from about 2:1 to 1:2, or even 1:1.

For most purposes, the stabilizer system including both zeolite and $C_6$ to $C_{12}$ metal carboxylate can be present in amount of from about 0.1 to about 7.0 phr. Preferably, the stabilizer system of the combination can be present at about 0.5 to about 6.0, or from about 0.75 to about 5.0. In some embodiments, the stabilizer system including both zeolite and $C_6$ to $C_{12}$ metal carboxylate can be present in amount of from about 1.0 to about 4.5, or even 1.25 or 1.5 to about 3.0.

In one embodiment, other co-stabilizers beside zeolite and carboxylate may also be employed in the co-stabilizer system. In an embodiment, the stabilizer system is essentially free of, or free of heavy metal stabilizers, such as tin stabilizers. By essentially free of it is meant that a minor portion may be present in amounts that do not contribute or contribute an insignificant amount to stabilization.

In another aspect, the invention includes a method of stabilizing a CPVC composition. The method comprises the step of employing in the CPVC composition a stabilizer system consisting essentially of or consisting of at least one of zeolite, $C_6$ to $C_{12}$ metal carboxylate, and combinations thereof.

In addition to the CPVC resin and stabilizer system, other ingredients typically added to CPVC compounds can be included in the compounds of the instant invention. The amount and nature of these ingredients is dependent upon the end use of the CPVC compound. The ingredients and their amount can be tailored to meet the end-use needs by one of ordinary skill in the art.

Chlorinated polyethylene (CPE) can also be added to the CPVC compound. The CPE is a rubbery material resulting from the chlorination of polyethylene having a substantially linear structure. The polyethylene can be chlorinated by various methods including aqueous suspension, solution or gas phase methods. An example of a method for preparing CPE can be found in U.S. Pat. No. 3,563,974. Preferably, the aqueous suspension method is used to form the CPE. If used as an impact modifier, the CPE material contains from 5 to 50% by weight of chlorine. Preferably, the CPE contains from 25 to 45% by weight of chlorine. However, the CPE can comprise a mixture of chlorinated polyethylenes, provided that the overall mixture has a chlorine content in the range of about 25 to 45% by weight chlorine. CPE is commercially available from The DuPont Dow Elastomer Company. The preferred CPE materials to be used in the compound include Tyrin™ 3611P, 2000 and 3615P; all available from the DuPont Dow Elastomer Company. Tyrin is a trademark of the DuPont Dow Elastomer Company.

The CPVC compounds may also include acrylic impact modifiers. U.S. Pat. No. 3,678,133 describes the compositions conventionally referred to as acrylic impact modifiers. Generally, the acrylic impact modifier is a composite interpolymer comprising a multi-phase acrylic base material comprising a first elastomeric phase polymerized from a monomer mix comprising at least 50 wt % alkyl methacrylate having 1-4 carbon atoms in the alkyl group and having a molecular weight of from 50,000 to 600,000. Further, the patent states that the polymerization of the rigid thermoplastic phase is preferably conducted in such a fashion that substantially all of the rigid phase material is formed on or near the surface of the elastomeric phase. Acrylic impact modifiers are polyacrylates including ($C_4$-$C_{12}$) acrylate homo or copolymers, second stage graft copolymerized with methyl methacrylate and styrene, poly(ethylhexyl acrylate-co-butyl-acrylate) graft copolymerized with styrene, and/or acrylonitrile and/or methyl methacrylate; polybutyl acrylate graft polymerized with acrylonitrile and styrene. Examples of suitable acrylic impact modifiers include Paraloid™ EXL-2330, KM™ 330, 334, and 365; all of which are available from Rohm and Haas. Paraloid is a trademark of the Rohm & Haas Company. Additionally Durastrength™ 200, available from Elf Atochem, and Kane Ace™ FM-10 and FM-25, available from Kaneka, are examples of commercially available acrylic impact modifiers.

Methyl butadiene styrene ("MBS") impact modifiers can also be added to the compounds of the present invention. MBS polymers are graft polymers. Generally, MBS impact modifiers are prepared by polymerizing methyl methacrylate or mixtures of methyl methacrylate with other monomers in the presence of polybutadiene or polybutadiene-styrene rubbers. Further information on MBS impact modifiers can be found in the Second Edition of the Encyclopedia of PVC, edited by Leonard I. Nass, Marcel Dekker, Inc. (N.Y. 1988, pp. 448-452). Examples of commercially available MBS impact modifiers include Paraloid KM™ 680, BTA™ 733, 751, and 753 available from Rohm & Haas, Kane Ace™ B-22 impact modifier and Kane Ace™ B-56 impact modifier available from Kaneka.

Typical of the graft copolymer impact modifiers are those generally referred to as "ABS" resins, which may generally be described as copolymers of styrene and acrylonitrile on butadiene containing rubber. ABS modifiers are usually prepared by polymerizing styrene and acrylonitrile in the presence of polybutadiene rubber. Examples of commercially available ABS impact modifiers which can be used in the instant invention include Blendex 338, Blendex 310 and Blendex 311; all available from GE Plastics. If used as the impact modifier of choice, approximately 5 parts to about 15 parts of ABS impact modifier are used. Preferably, 6 parts of the ABS impact modifier are used.

Other additives can also be added to the CPVC compounds as needed. Conventional additives known in the art as well any other additives may be used, provided that the additive does not alter the physical properties and the process stability associated with the novel compounds. Examples of additives which can be used include antioxidants, lubricants, other stabilizers, other impact modifiers, pigments, glass transition enhancing additives, processing aids, fusion aids, fillers, fibrous reinforcing agents and antistatic agents. The amount and nature of the additives incorporated into the halogen containing compounds stabilized by the zeolite is well within the skill of one of ordinary skill in the art.

Exemplary lubricants are polyglycerols of di- and trioleates, polyolefins such as polyethylene, polypropylene and oxidized polyolefins such as oxidized polyethylene and high molecular weight paraffin waxes. Since several lubricants can be combined in countless variations, the total amount of lubricant can vary from application to application. Optimization of the particular lubricant composition is not within the scope of the present invention and can be determined easily by one of ordinary skill in the art. Preferably, an oxidized polyethylene is used. An example of an oxidized polyethylene is AC 629A, sold by Allied Signal. In addition to the oxidized polyethylene, preferably a paraffin wax can also be included in the compounds of the instant invention. An example of a paraffin wax is Paraffin 160F Prill from Witco.

Suitable processing aids include acrylic polymers such as methyl acrylate copolymers. Examples of process aids include Paraloid K-120ND, K-120N, K-175; all available from Rohm & Haas. A description of other types of processing aids which can be used in the compound can be found in The Plastics and Rubber Institute: International Conference on PVC Processing, Apr. 26-28 (1983), Paper No. 17.

An example of antioxidants to be used in the halogen containing compounds include Irganox 1010 (tetrakis[methylene(3,5-di-tert-butyl-4-hydroxyhydrocinnamate)]methane) sold by Ciba, if used at all.

Suitable pigments include among others titanium dioxide, and carbon black. Examples of titanium dioxide is Tiona RCL-6 and RCL-4 from Millenium Inorganics. An example of carbon black is Raven 410, available from Columbian Chemicals.

Suitable inorganic fillers include talc, clay, mica, wollastonite, silicas, and other filling agents.

The components of the unique compound can be made in any manner wherein the various components are added together and mixed under heat. For example, the appropriate amount of the CPVC resin can be added to a vessel such as Henschel mixer or a ribbon blender. The remaining ingredients of the compound can then be added thereto and mixed until the blend is homogeneous. If pellets are to be formed, the compound can be melt mixed. Melt mixing can generally occur in the temperature range of about 150 to about 250° C. Once the blend is formed, it can be processed further depending upon the desired application in any conventional manner, using extrusion or molding techniques.

If extrusion techniques are used to process the composition of the present invention, generally conventional extrusion machinery such as a multiscrew extruder or a single screw extruder are used. An extruder generally has conveying means, an intermediate screw processing means and a final die through which the material is discharged in the form of an extrudate. Generally, a multi-screw extruder is used for the extrusion of pipe. Examples of possible conventional extruders to be used to process the CPVC and PVC compounds containing the zeolite include the following twin screw counter-rotating extruder models from Cincinnati Milacron: CM 35HP, CM 55HP, CM 65HP, CM 80HP, CM 92HP. Examples of suitable conical twin screw extruders from Krauss Maffei include KMD-2/40KK and KMD-2/50KK.

The CPVC compound made according to the instant invention has the following characteristics: a tensile strength in the range of about 5,000 to about 10,000 psi (as measured according to ASTM D 638-95); a Notched Izod in the range of about 1.0 to about 20 ft.lb. per inch of notch (as measured according to ASTM D 256-93A); a dynamic thermal stability of greater than 14 minutes, such as, for example, in the range of about 14 to about 60 minutes as measured, unless otherwise specified:

1) Counter rotating batch mixing bowl is set at 190-205° C. depending on formulations, 75 grams sample is charged to the batch mixer unless otherwise specified;
2) 1 minute sample loading at 10 rpm, followed by 2 minutes gentle mixing at 1 rpm, followed by 35 rpm run until sample degrades. Stability timing starts at 35 rpm;
3) A small pinch sample is taken at 7 minutes after 35 rpm is achieved, and then every minute thereafter.

); a heat distortion temperature (HDT) in the range of about 80° to about 140° C. (as measured by ASTM D 648-95). This novel compound can be formed into any article desired. Examples include but are not limited to sheet, pipe, ducts, fittings, valves, injection molded and thermoformed industrial parts, appliance housing, fabricated parts, and different containers.

In a preferred embodiment, the CPVC compound can be employed to prepare pipe.

It is known that some of the materials described above may interact in the final formulation, so that the components of the final formulation may be different from those that are initially added. For instance, metal ions (of, e.g., a detergent) can migrate to other acidic or anionic sites of other molecules. The products formed thereby, including the products formed upon employing the composition of the present invention in its intended use, may not be susceptible of easy description. Nevertheless, all such modifications and reaction products are included within the scope of the present invention; the present invention encompasses the composition prepared by admixing the components described above.

The invention herein is useful for preparing stable CPVC compounds and particularly CPVC compounds that can be extruded into pipe, which may be better understood with reference to the following examples.

EXAMPLES

Sample Preparation Procedure
Resin
CPVC resin is prepared in a pilot plant for specific IV and chlorine content. For stabilizers that are water soluble, the resin is wet coated and dried. Wet resin is dried in a flat tray at room temperature for two days inside a natural vent hood to be free of free moisture.
Stabilizers
Some of the carboxylate stabilizers evaluated are available in acid form purchased from Sigma-Aldrich (unless otherwise specified). In such cases, the acid is neutralized with 20% NaOH solution to a pH of 7.5-8.0 and fully dissolved in water to form a salt solution. In some cases, for example, with higher carbon length carboxylates, such as sebacate and dodecanedioate, the salt solution is raised to about 60-80° C. to make sure the neutralized sodium carboxylates are soluble before being added to the resin for blend mixing. 15 phr by weight of the salt solution per 100 phr resin is mixed in a blender to make sure the resin is fully mixed with the solution at the desired stabilizer phr level.

Other of the stabilizers are available as powder. All powder ingredients are mixed together using a ware blender.

DTS Measurement

The Dynamic Thermal Stability (DTS) provides a measure of the thermal stability of a compound. A longer DTS time is indicative of a compound with enhanced stability.

The Brabender™ DTS batch mixer is used to study melt stability. One way to determine stability time is by analyzing where the DTS curve increases by 100 mg, combined with visual inspection of the melt appearance, indicates degradation time. At the point of melt degradation, the melt color typically will show a very visible darkened color. Monitoring color change is also a good way to study melt stability by pinching out a small melt chip for the color record at selected time intervals. Higher DTS stability is preferred.

The DTS procedure used herein is as follows, unless otherwise specified:
1) Counter rotating batch mixing bowl is set at 190-205° C. depending on formulations, 75 grams sample is charged to the batch mixer unless otherwise specified
2) 1 minute sample loading at 10 rpm, followed by 2 minutes gentle mixing at 1 rpm, followed by 35 rpm run until sample degrades. Stability timing starts at 35 rpm;
3) A small pinch sample is taken at 7 minutes after 35 rpm is achieved, and then every minute thereafter.

Example 1

Initial Stabilizer Screening Relying on DTS Curve (205° C.)

Table 1 shows DTS stability time of different stabilizers at 2.5 phr loading level added to a 0.92 IV CPVC resin having 66.25 wt % chlorine, along with 13 phr of a masterbatch of further additives made from 0.5 phr CPE, 6.5 phr MBS impact modifier, 0.25 phr Antioxidant, 4.0 phr TiO$_2$, 0.25 phr Fisher Tropsch wax lubricant, 1.5 phr oxidized polyethylene wax lubricant

TABLE 1

| stabilizer | Level (phr) | DTS time (min:S) | Plate-out++ |
|---|---|---|---|
| 3107-309+ | 2.5 | 5:45 | No |
| Sodium citrate | 2.5 | 4:00 | Yes |
| Sodium lactate | 2.5 | 5:00 | Yes |
| Ca lactate | 2.5 | 2:38 | Yes |
| Sodium succinate | 2.5 | 4:30 | Yes |
| Sodium maleic | 2.5 | 4:10 | Yes |
| Sodium fumarate | 2.5 | 4:15 | Yes |
| Sodium adipate | 2.5 | 4:10 | Minor dull surface |
| Sodium salicylate | 2.5 | 4:00 | Yes |

TABLE 1-continued

| stabilizer | Level (phr) | DTS time (min:S) | Plate-out++ |
|---|---|---|---|
| Sodium Benzoate | 2.5 | 3:52 | Yes |
| Sodium Terephthalate | 2.5 | 4:28 | Yes |
| Sodium suberate | 2.5 | 4:30 | No |
| Sodium Acetylsalicylate | 2.5 | 5:24 | No |
| Sodium Azelate | 2.5 | 7:30 | No |
| Sodium Sebacate | 2.5 | 6:00 | No |
| Sodium Dodecanedionate | 2.5 | 4:30 | No |
| Carbos-sperse 7028+++ | 2.5 | 3:35 | Yes |
| Zeolite Type A | 2.5 | 6:08 | No |
| Zeolite Type P | 2.5 | 7:00 | No |
| DHT-4A | 2.5 | 7:20 | No |
| Sorbacid 911 | 2.5 | 7:10 | No |
| Kisuma 5B | 2.5 | 2:30 | No |

+Flowgard Gold from Lubrizol
++plate-out is seen as a hard white deposit on the bowl and rotor metal surface after degradation that is very difficult to clean. Plate-out is highly undesirable during melt processing.
+++polyacrylate from Lubrizol with pH neutralized to 8.0
Kisuma 5B is a fatty acid surface treated Mg(OH)2.
DHT-4A: small particle hydrotalcite from Mitsui.
Sorbacid 911: hydrotalcite from Sud-Chemie.

Zeolites, hydrotalcites, and some of the metal carboxylates show desirable stability.

Example 2

Stabilizer Level Effect on Selected Candidates

Table 2 shows stability at different stabilizer levels from the selected candidates using the same base resin and masterbatch as set forth in example 1.

TABLE 2

| | DTS stability time in min:second (205° C.) | | | | |
|---|---|---|---|---|---|
| Level (phr) | 0.5 | 1.0 | 1.5 | 2.0 | 2.5 |
| Zeolite Type A | 6:50 | 7:30 | 7:22 | | 6:08 |
| Zeolite Type P | 5:30 | 6:24 | 6:08 | | 7:00 |
| Zeolite Type A (07 μm D90)++++ | | | 7:30 | | |
| DHT-4A | 5:18 | 6:22 | 6:44 | | 7:20 |
| Sorbacid 911 | 5:46 | 6:16 | 7:12 | | 7:10 |
| Sodium azelate | | 5:12 | 5:20 | 6:02 | 7:30 |
| Sodium sebacate | | | 6:24 | | 6:00 |

++++Zeolite Type A (0.7 μm D90): 07 μm D50 average zeolite is made by a Eiger wet milling Zeolite Type A using a Labstar LS1 wet mill from Netzsch. The wet milled sample (water slurry without any other additive) at 25% solids is spray dried using a pilot scale spray dryer. Milling beads are 0.3 mm Zirmil-Y from Dynamic Media.

Zeolites and hydrotalcites are effective from about 0.5-1.5 phr and are equally effective as stabilizers for CPVC resin. Type A zeolite is somewhat more effective than type P zeolite. Sodium azelate and sodium sebacate are less effective than zeolites and need to have a high level of around 1.5-2.5 phr to be effective.

Example 3

Pipe Extrusions with Zeolite and Hydrotalcite

Pipe extrusions are conducted using a TC-55 conical counterrotating twin screw extruder setup for a 0.75" CTS SDR 11 pipe size. 1.5 phr Zeolite Type P and 1.5 phr Sorbacid 911, repectively are added to 100 phr 0.92 IV CPVC resin having 66.3% chlorine (Temprite 674×663) along with 0.75 phr CPE, 6.5 phr MBS impact modifier, 0.25 phr Antioxidant, 4.0 phr $TiO_2$, and 0.25 phr Fisher Tropsch wax lubricant, 1.5 phr oxidized polyethylene wax lubricant. Processing conditions for the extrusion are as follows: barrel zone 1 at 350° F. (feed end), barrel zone 2 at 355° F., barrel zone 3 at 360° F., barrel zone 4 at 360° F., die 1 at 350° F., die zone 2 at 355° F., die zone 3 at 355° F., screw oil at 355° F. Screw at 22 rpm with a running rate of 250 Lbs/hr for formulations containing zeolite and 190 pounds/hr for formulations containing hydrotalcite.

The pipe prepared with hydrotalcite exhibited severe foaming. Even though hydrotalcites are effective stabilizers, severe foaming problems preclude them from being used as stabilizers for CPVC products, unlike in PVC products.

Example 4

Gray Color Hold Stability Using DTS (190° C.) Sample Pinching Method

Color hold stability is another measure of melt stability. A small sample of the compound is taken using a sampling plier during DTS melt mixing. The color samples are measured using a GretagMacbeth Color i7 color measuring device, for L, a,b, YI and DeltaE, and a white color sample, GretagMacbeth NetProfiler STQ1391 White, is used as a reference.

Color readings to determine stability time need to use color chip samples as a reference to determine a best reading number from all of the optical data. For gray samples, the best index to use is yellow index (YI-E313, white control used as reference). Such reading is more accurate than relying on visual observation as it can be difficult for the eye to detect the difference when there is a relatively smooth color shift. Stability time is called, or set, based on the reading from yellow index (YI). Melt stability is determined when the YI stays at around 9.0-10.0. Afterward, YI typically jumps noticeably and matches visual observation.

Table 3 lists the formulations tested, which contain various levels of stabilizers employed in gray formulations. A 0.92 IV CPVC resin having 65.25% chlorine is used. The time to reach a YI of around 9.0 to 10.0 is provided as the stability time. The color pinching method in general has an experimental error of about 0.5-1.0 minute on stability time.

TABLE 3

Zeolites and sodium carboxylates in gray CPVC formulations

| Sample | Stabilizer | Stabilizer Amount | Other additive MB | Stability Time |
|---|---|---|---|---|
| 1 | ZEOLITE A | 0.75 | 11.6 | 14 |
| 2 | ZEOLITE A | 1.25 | 11.6 | 16 |
| 3 | ZEOLITE P | 1 | 11.6 | 13 |
| 4 | ZEOLITE P | 1.5 | 11.6 | 13 |
| 5 | NaC6 | 0.75 | 11.6 | 9 |
| 6 | NaC6 | 1 | 11.6 | 10 |
| 7 | NaC6 | 1.5 | 11.6 | 11 |
| 8 | NaC6 | 2 | 11.6 | 10 |
| 9 | NaC6 | 100.75 | 11.6 | 9 |
| 10 | NaC6 | 101 | 11.6 | 8 |
| 11 | NaC8 | 101 | 11.6 | 13 |
| 12 | NaC8 | 101.5 | 11.6 | 13 |
| 13 | NaC9 | 101 | 11.6 | 9 |
| 14 | NaC9 | 101.5 | 11.6 | 9 |

TABLE 3-continued

Zeolites and sodium carboxylates in gray CPVC formulations

| Sample | Stabilizer | Stabilizer Amount | Other additive MB | Stability Time |
|---|---|---|---|---|
| 15 | NaC10 | 1 | 11.6 | 11 |
| 16 | NaC10 | 1.5 | 11.6 | 9 |
| 17 | NaC10 | 2 | 11.6 | 10 |
| 18 | Zeolite A/$NaC_6$ | 0.75/100.75 | 11.6 | 14 |
| 19 | Zeolite A/$NaC_6$ | 0.5/101 | 11.6 | 9 |
| 20 | Zeolite A/$NaC_8$ | 0.5/101 | 11.6 | 14 |
| 21 | Zeolite A/$NaC_8$ | 0.5/101.5 | 11.6 | 14 |
| 22 | Zeolite A/$NaC_9$ | 0.5/101 | 11.6 | 9 |
| 23 | Zeolite A/$NaC_9$ | 0.5/101.5 | 11.6 | 11 |
| 24 | Zeolite A/$NaC_{10}$ | 0.5/101 | 11.6 | 14 |
| 25 | Zeolite A/$NaC_{10}$ | 1.0/101 | 11.6 | 16 |
| 26 | Zeolite A/$NaC_{12}$ | 0.5/101.25 | 11.6 | 14 |
| 27 | control | | 3118-245 control | 11 |

*Na C6-12 CPVC stands for disodium carboxylates of corresponding carbon number.
**Other additive MB is made of: 0.25 phr CPE, 4.75 phr MBS impact modifier, 0.25 phr Antioxidant, 4.0 phr titanium dioxide, 1.0 phr Fisher Tropsch wax lubricant, 1.2 phr oxidized polyethylene wax lubricant, 0.15 phr Carbon Black 410 for a total of 11.6 phr.
***3118-245 is a commercial Corzan gray product from Lubrizol containing a tin stabilizer.
$NaC_{6-12}$ at more than 100 parts indicates that 100 parts of CPVC resin is wet coated with from 0.75 to 1.5 parts of the $NaC_{6-12}$ carboxylates; so 100.75 is 100 parts of CPVC resin coated with 0.75 carboxylate.
Otherwise, the carboxylates are added to the formulations as a powder blend.

Combining zeolite with disodium carboxylates performed very well at reduced zeolite levels as seen from samples 18, 20 21, 24, and 26.

Example 5

Orange Color Hold Stability Using DTS (190° C.) Sample Pinching Method

Table 4 lists the formulations tested, which contain various levels of stabilizers employed in orange CPVC compound formulations. A 0.92 IV CPVC resin having 65.25% chlorine is used. The time to reach an L value of around 69 to 70 is provided as the stability time. The color pinching method in general has an experimental error of about 0.5-1.0 minute on stability time. Blazemaster 88738-734G is used as a control, which is a commercial CPVC compound from Lubrizol containing tin based stabilizer.

TABLE 4

| Sample | Stabilizer | | Stabilizer Amount | | Stability time (min) |
|---|---|---|---|---|---|
| 28 | ZEOLITE A | | 0.5 | | 10 |
| 29 | ZEOLITE A | | 1.0 | | 16 |
| 30 | ZEOLITE A | | 1.5 | | 17 |
| 31 | ZEOLITE P | | 0.75 | | 13 |
| 32 | ZEOLITE P | | 1.25 | | 15 |
| 33 | $NaC_6$ | | 1.5 | | 10 |
| 34 | $NaC_{10}$ | | 1.5 | | 11 |
| 35 | $NaC_6$ | ZEOLITE A | 101 | 0.5 | 13 |
| 36 | $NaC_8$ | ZEOLITE A | 101 | 0.5 | 15 |
| 37 | $NaC_9$ | ZEOLITE A | 101 | 0.5 | 11 |
| 38 | $NaC_{10}$ | ZEOLITE A | 101 | 0.5 | 17 |
| 39 | $NaC_{12}$ | ZEOLITE A | 101 | 0.5 | 12 |
| 40 | 88738-734G control | | | | 13 |

*Na C6-12 CPVC stands for disodium carboxylates of corresponding carbon number.
Other additive MB is made of: 0.25 phr CPE, 4.75 phr MBS impact modifier, 0.25 phr Antioxidant, 4.0 phr titanium dioxide, 1.0 phr Fisher Tropsch wax lubricant, 1.2 phr oxidized polyethylene wax lubricant, 0.15 phr Carbon Black 410 for a total of 11.6 phr. $NaC_{6-12}$ at more than 100 parts indicates that the *$NaC_{6-12}$ at more than 100 parts indicates that 100 parts of CPVC resin is wet coated with from 0.75 to 1.5 parts of the $NaC_{6-12}$ carboxylates; so 100.75 is 100 parts of CPVC resin coated with 0.75 carboxylate.
Otherwise, the carboxylates are added to the formulations as a powder blend.

Example 6

Pipe Formulations

¾" copper tube size (CTS) standard dimension ratio (SDR) 11 pipes are made free of moisture foaming problem using a conical counter-rotating twin screw extruder TC-55. Barrel temperatures are set at: 370° F., die temperature set at 380-390° F. Screw oil at 340-365° F. Screw is run at 21-22 rpm. Feeds are run at 230-260 lbs/hr. The formulations are provided in Table 5.

Pipes made of the formulations below meet cell class of 23447. The formulation can also be adjusted to meet 23448 cell class rating by increasing chlorine content in CPVC resin. Long term hydrodynamic hoop stress test at 180° F. is tracking well meeting intended design pressure rating of at least 100 psi hydraulic pressure.

TABLE 5

Gray CPVC formulations for pipe extrusion

| | run ID | | |
|---|---|---|---|
| Raw material | 41 | 42 | 43 |
| 65.25Cl% CPVC (0.92IV) | 100 | 100 | 100 |
| Zeolite Type A | | 1.0 | 0.75 |
| Zeolite Type P | 1.5 | | |
| Disodium sebacate | | | 0.5 |
| MBS impact modifier | 4.75 | 5.00 | 5.0 |
| CPE | 1.0 | 0.25 | |
| Antioxidant | 0.25 | 0.25 | 0.25 |
| Titanium Dioxide | 3.5 | 3.5 | 3.5 |
| Fisher Tropsch wax Lubricant | 0.85 | 0.9 | 0.9 |
| Oxidized polyethylene wax lubricant | 1.0 | 0.8 | 1.1 |
| Polyethylene wax lubricant | 0.4 | 0.55 | 0.25 |
| Carbon Black | 0.15 | 0.15 | 0.15 |
| Physical properties | | | |
| Tensile strength at yield (psi) | 7637 | 7748 | not measured |
| Tensile Modulus(kpsi) | 385 | 377 | not measured |
| Notched Izod (ft-lbs/in) | 2.80 | 4.64 | 2.30 |
| Drop dart impact (ft-lbs) | 29.4 | 22.8 | 22.2 |
| Vise crush (60%, 100%) | pass, pass | pass, pass | pass, pass |
| HDT (° C., annealed at 100° C.) | 108 | 109 | 109 |

Example 7

Fitting Formulations

Fitting formulations are provided for injection molding in table 6.

TABLE 6

Gray CPVC compounds for injection molding

| | run ID | |
|---|---|---|
| Raw material | 44 | 45 |
| 65.25Cl% CPVC (0.68IV) | 100 | 100 |
| Zeolite Type A | 1.5 | |
| 0.7 μmD90 zeolite | | 1.5 |
| MBS Impact Modifier | 7.5 | 7.5 |
| Antioxidant | 0.3 | 0.3 |
| Titanium dioxide | 3.5 | 3.5 |
| Fisher Tropsch wax lubricant | 1.05 | 1.05 |
| Oxidized polyethylene wax lubricant | 1.2 | 1.2 |
| Carbon Black | 0.15 | 0.15 |
| Physical properties | | |
| Notched Izod (ft-lb/in) | 1.9 | 2.3 |
| Heat distortion Temperature (° C.) Annealed at 97° C. | 105 | 105 |
| Melt Flow Index (MFI) (215° C., 21.6 kgs) | 9.4 | 9.3 |

Each of the documents referred to above is incorporated herein by reference, including any prior applications, whether or not specifically listed above, from which priority is claimed. The mention of any document is not an admission that such document qualifies as prior art or constitutes the general knowledge of the skilled person in any jurisdiction. Except in the examples, or where otherwise explicitly indicated, all numerical quantities in this description specifying amounts of materials, reaction conditions, molecular weights, number of carbon atoms, and the like, are to be understood as modified by the word "about." It is to be understood that the upper and lower amount, range, and ratio limits set forth herein may be independently combined. Similarly, the ranges and amounts for each element of the invention can be used together with ranges or amounts for any of the other elements.

As used herein, the transitional term "comprising," which is synonymous with "including," "containing," or "characterized by," is inclusive or openended and does not exclude additional, un-recited elements or method steps. However, in each recitation of "comprising" herein, it is intended that the term also encompass, as alternative embodiments, the phrases "consisting essentially of" and "consisting of," where "consisting of" excludes any element or step not specified and "consisting essentially of" permits the inclusion of additional un-recited elements or steps that do not materially affect the basic and novel characteristics of the composition or method under consideration.

While certain representative embodiments and details have been shown for the purpose of illustrating the subject invention, it will be apparent to those skilled in this art that various changes and modifications can be made therein without departing from the scope of the subject invention. In this regard, the scope of the invention is to be limited only by the following claims.

What is claimed is:

1. A rigid chlorinated polyvinyl chloride ("CPVC") polymer composition comprising (a) a CPVC polymer resin having from about 64 to about 67 weight % chlorine, and (b) a stabilizer system containing only from about 0.1 to about 3.0 parts zeolite and optionally a $C_6$ to $C_{12}$ metal carboxylate, and combinations thereof, wherein the zeolite has a water content of greater than 10 weight percent and a ratio of silicon to aluminum of less than 1.5.

2. The rigid CPVC polymer composition of claim 1, wherein the composition includes a combination of the zeolite and the $C_6$ to $C_{12}$ metal carboxylate and the weight ratio of zeolite to $C_6$ to $C_{12}$ metal carboxylate is between about 6:1 to 1:6.

3. The rigid CPVC polymer composition of claim 1, wherein said stabilizer system is present in amount of from about 0.1 to about 6.0 parts by weight per 100 parts by weight of said CPVC resin.

4. The rigid CPVC polymer composition of claim 1, wherein at least one $C_6$ to $C_{12}$ metal carboxylate is present from about 0.1 to about 3.0 parts by weight per 100 parts by weight of said rigid CPVC polymer resin.

5. The rigid CPVC polymer composition of claim 1, wherein the zeolite has sub-micron particle size.

6. The rigid CPVC polymer composition of claim 1, wherein the carboxylate of said $C_6$ to $C_{12}$ metal carboxylate is at least one of suberate ($C_8$), sebacate ($C_{10}$), dodecandioate ($C_{12}$) and combinations thereof.

7. The rigid CPVC polymer composition of claim 1, wherein the $C_6$ to $C_{12}$ metal carboxylate is disodium sebacate.

8. The rigid CPVC polymer composition of claim 1 wherein the Dynamic Thermal Stability time as measured according to ASTM D2538 is greater than 14 minutes at 190° C.

9. A pipe comprising the rigid CPVC polymer composition according to claim 1.

10. A pipe fitting comprising the rigid CPVC polymer composition according to claim 1.

11. A method of stabilizing a rigid CPVC polymer composition comprising employing in the rigid CPVC polymer composition a stabilizer system containing only from about 0.1 to about 3.0 parts zeolite and optionally a C6 to C12 metal carboxylate, or combinations thereof, wherein the zeolite has a water content of greater than 10 weight percent and a ratio of silicon to aluminum of less than 1.5.

* * * * *